(12) United States Patent
Martinez

(10) Patent No.: US 7,571,753 B2
(45) Date of Patent: Aug. 11, 2009

(54) HEAT WELDING NOZZLE FOR SEALING FLOORING SEAMS

(76) Inventor: Leo Martinez, 6381 Western Ave., Buena Park, CA (US) 90621

( * ) Notice: Subject to any disclaimer, the term of this patent is extended or adjusted under 35 U.S.C. 154(b) by 410 days.

(21) Appl. No.: 11/642,031

(22) Filed: Dec. 18, 2006

(65) Prior Publication Data

US 2008/0142164 A1 Jun. 19, 2008

(51) Int. Cl.
B29C 65/12 (2006.01)
(52) U.S. Cl. .................. 156/497; 156/499; 156/574; 156/579
(58) Field of Classification Search .................. 156/82, 156/497, 499, 574, 575, 579
See application file for complete search history.

(56) References Cited

U.S. PATENT DOCUMENTS

| 2,372,737 | A | | 4/1945 | Phillips, Jr. | |
|---|---|---|---|---|---|
| 2,862,543 | A | | 12/1958 | Kaminsky | |
| RE24,801 | E | * | 3/1960 | Kaminsky | 156/497 |
| 3,853,669 | A | * | 12/1974 | Werstlein | 156/497 |
| 4,642,158 | A | * | 2/1987 | Steinel et al. | 156/497 |
| 5,656,126 | A | | 8/1997 | Martinez | |
| 6,871,013 | B2 | | 3/2005 | Martinez | |

FOREIGN PATENT DOCUMENTS

| DE | 1898146 | 8/1964 |
|---|---|---|
| DE | G 94 09 920.0 | 6/1994 |
| DE | 29713474 | 11/1997 |
| GB | 818066 | 8/1959 |

OTHER PUBLICATIONS

Leister Process Technologies Catalog, Plastic Fabarication, ISO 9001-2000, p. 7, Oct. 2001.
Janser Katalog 106, pp. 46-48, 2006.
Laramy Products Co., Inc. Catalog LP-F, Thermoplastic Welding Torches and Accessory Equipment, p. 9.
Abbeon's Plastic Working Catalog 606H, pp. 62-64 & 69.
Zinser Super Rapid Nozzle, Oct. 1994, 3 pages.

* cited by examiner

*Primary Examiner*—James Sells
(74) *Attorney, Agent, or Firm*—Charles H. Thomas

(57) ABSTRACT

A heat and sealant delivery nozzle is constructed for sealing seams between adjacent sheets of flooring. The nozzle of the invention is formed from separate, mating sealant feeding and hot air conducting members that fit to and are secured together. The two part construction of the nozzle produces first and second enclosed plenum chambers therebetween with a series of ducts and passages that preheat both the groove in the flooring that is to receive molten sealant, and the sealant itself. Furthermore, although the pattern of ducts, passages, and cavities within the finished nozzle is quite intricate, the ducts, passageways, and ports are formed without great difficulty due to the two part construction of the nozzle. Moreover, the nozzle is constructed so that the hot air does not mix with the sealant within an internal melting chamber, but rather makes contact with the molten sealant only when the sealant leaves the nozzle.

19 Claims, 8 Drawing Sheets

HEAT WELDING NOZZLE FOR SEALING FLOORING SEAMS

BACKGROUND OF THE INVENTION

1. Field of the Invention

The present invention is a heat nozzle designed for use with a portable, handheld seam sealing welding gun for dispensing a molten sealant to join adjacent sheets of flooring.

2. Description of the Prior Art

In laying flooring that is sold commercially in sheets, such as linoleum flooring, adjacent sheets of flooring are positioned side by side and cut to the desired shape. The flooring sheets are secured to the floor by adhesive compound. To secure the flooring sheets to the floor, the compound is applied to the floor and the cut sheets of flooring are laid in position, one by one. Once each sheet of flooring is laid, the next adjacent flooring sheet is brought into position and pressed against the floor with the linear edges of adjacent flooring sheets residing in mutual side-by-side abutment.

One major problem with laying sheets of flooring in this manner is that the adhesive bond between the underside of the flooring sheets and the subfloor therebeneath is sometimes inadequate. Quite often areas of the sheets of the linoleum flooring will tend to separate from the subfloor when the adhesive bond between the subfloor and the flooring sheets deteriorates due to age, movement of the subfloor, or improper installation.

The separation of areas of flooring sheets from the subfloor is particularly pronounced at the seams between adjacent sheets of flooring. The edges of adjacent flooring sheets which are supposed to reside in firm, mutual abutment, will sometimes tend to rise slightly from the subfloor. This presents both an unsightly appearance and also leads to a significant deterioration of the floor because of the separation that occurs when the edges of adjacent sheets of flooring rise. When separation between adjacent sheets of flooring occurs in this way, moisture, dirt and debris often find their way into the crack that forms between the flooring sheets, thus leading to further deterioration of the floor.

In the floor installation trade the use of fusible plastics to form a seal between the abutting edges of adjacent sheets of flooring has gained increased popular acceptance. According to this technique adjacent sheets of flooring are moved into abutting relationship and a grooving tool is used to cut an upwardly facing, elongated groove where the abutting sheets of flooring meet. That is, the seams of the sheets of flooring are cut with a groove so that the exposed upper surface of each sheet covers a slightly smaller area than its concealed undersurface, thus providing adjacent surfaces forming a groove or channel between adjoining sheets of flooring. These adjacent surfaces can be bonded together using a fusible thermoplastic applied from above. The color of the thermoplastic is chosen to match the color of the flooring so as to render the demarcation between adjacent sheets of flooring largely undetectable.

For quite some time portable, handheld seam welding guns have been available commercially which melt sealant to seal floor seams. Conventional seam welding guns are typically electrically powered and melt a thermoplastic bead by means of resistance heating of hot air. The heated air is directed at the sealant to melt it in a melting chamber within a nozzle so that the molten sealant flows into the groove.

Handheld seam welding guns of this type are typically configured with a generally cylindrical body forming the rear portion of the gun and a heat conducting member projecting forwardly from the body along a longitudinal axis. Conventional, portable handheld seam welding guns of this type are manufactured in Europe by Leister Process Technologies, CH-6060 Sarnen, Switzerland. Other, comparable commercial seam welding guns are also available, such as the Zinser K-5 handheld welder that is available from Zinser Schweisstechnik GmbH, Stuttgarter Strasse 145, 73061 Ebersback/Fils, Stuttgart, Germany.

An adapter having a heat concentration nose, typically formed of a highly conductive metal, such as copper or a copper alloy, is mounted on the heat conducting member and includes a heating tip mounting tube. The heating tip mounting tube projects forwardly along the longitudinal axis of the body and has a narrow, tubular configuration. This type of adapter is often referred to in the trade as a "pencil tip" adapter. The heating tip mounting tube fits into the hollow heat welding nozzle.

A conventional, portable, handheld seam welding gun heat welding nozzle includes a hollow cylindrical sleeve that fits onto the heating tip mounting tube and another tubular structure that accommodates an elongated length or stick of thermoplastic that is fed into the interior of the heat welding nozzle and melted therein.

The nozzle construction is extremely important in order to achieve a smooth weld that will completely seal the seam but which will not damage the flooring. In recent years sheets of flooring having urethane finish coatings have gained in popularity. While quite attractive, such floorings are more sensitive to heat than floorings constructed completely of other materials, such as thermoplastic. As a consequence, many conventional heat welding nozzles damage the flooring finish by scorching or discoloring it.

A number of different nozzles are currently utilized to seal seams in sheets of flooring constructed of temperature sensitive materials. However, conventional nozzles used for this purpose are prone to scorch the flooring or discolor the edges of the flooring when melting the sealant into a groove between adjacent sheets of flooring. One typical welding nozzle that is utilized is sold by Janser GmbH located in Ehnington, Germany as the Ultra-Speed-Nozzle, Part No. 224 800 007. This same company also sells the Speed Weld Nozzle as Part No. 224 700 300. Laramy Products Co., Inc. located in Lyndonville, Vt. sells the Universal High-speed Tip that is sometimes used for welding seams between sheets of thermally sensitive flooring. The Zinser Company also sells the Super Rapid Nozzle that is sometimes utilized for the same purpose. However, all of these conventional nozzles produce mediocre results. All of them are prone to scorch the flooring and/or discolor the edges of the flooring sheets during the seam welding process.

SUMMARY OF THE INVENTION

According to the present invention a seam welding nozzle with a very unique design is provided which produces markedly superior results in welding seams between thermally sensitive sheets of flooring. The nozzle of the present invention has a unique, intricate array of internal plenum chambers, channels and ducts that melt the sealant without scorching it and which preheat both the sealant and the edges of adjacent sheets of flooring without the discoloration that is so characteristic of conventional nozzles. Moreover, while the pattern of cavities, ducts, passages and channels in the seam welding nozzle of the present invention is quite intricate, fabrication is relatively simple due to the fact that the nozzle is constructed of two components parts, rather than a single part molded structure of the type utilized to produce seam welding nozzles for so many years.

According to the present invention the nozzle is comprised of a sealant feeding member and a hot air conducting member which are initially separate component parts. These two members our molded, cast or stamped separately with surfaces that are initially exposed and can be easily machined when the two parts are still separated. The component parts are then fitted together with mating flat surfaces residing in face-to-face contact. These flat surfaces are initially produced at the mold part lines in forming the two parts separately. The required internal cavities, channels and chambers are formed by depressions in the flat surfaces that are created during the molding process, and by machining that is quite simple to perform before the parts are assembled together.

In one broad aspect the present invention may be considered to be a heat and sealant delivery nozzle for sealing seams between adjacent sheets of flooring. The nozzle is formed from separate, mating sealant feeding and hot air conducting members that fit and are secured together to enclose first and second plenum chambers therebetween. The sealant feeding member and the hot air conducting member form a plurality of hot air inlet ducts for receiving hot air from a hot air supply. These include a first hot air inlet duct leading from the hot air supply to the first plenum chamber and a second hot air inlet duct leading from the hot air supply to the second plenum chamber.

The hot air conducting member has a linear seam preheating floor contact edge with forward and rearward extremities and a plurality of separate hot air exhaust ports lying along its length. All of these hot air exhaust ports are in airflow communication with the first plenum chamber.

The sealant feeding member has a hollow, sealant feeding tube formed by its structure and defining a sealant feeding channel therewithin that has a straight, linear alignment. The sealant feeding channel is isolated from direct airflow communication with the hot air supply. The sealant feeding channel has a sealant inlet opening above the second plenum chamber and a sealant outlet opening formed adjacent to and forward from the floor contact edge of the hot air conducting member.

The second plenum chamber is located immediately adjacent to the sealant feeding tube which serves as a septum between the sealant feeding channel and the second plenum chamber. A sealant preheating duct is defined within the structure of the nozzle leading from the hot air supply to a sealant preheating port located above and immediately adjacent to the sealant feeding tube.

Preferably the linear seam preheating floor contact edge of the heat and sealant delivery nozzle of the invention has a narrow, flat edge center surface formed as a strip no greater than about fifty millimeters wide and between about two and four centimeters long and beneath the first plenum chamber. The hot air exhaust ports each have circular apertures no greater than about 0.5 millimeters in diameter and are formed in this narrow center surface. Inclined surfaces slope upwardly and away from the narrow flat edge center surface. As a result, the floor contact edge has a truncated V-shaped surface configuration with separate exhaust passageways leading from the first plenum chamber to each of the hot air exhaust ports. In cross section the linear seam preheating contact edge has a truncated, wedge-shaped configuration There are preferably at least ten hot air exhaust ports linearly aligned along the length of the seam preheating contact edge.

The sealant preheating duct has a downstream leg that is oriented in its alignment along a line of intersection with the straight linear alignment of the sealant feed channel. Consequently, a jet of hot air is ejected from the sealant preheating port and is directed at sealant entering the sealant feed channel at the sealant inlet opening thereof. Preferably the downstream leg of the sealant preheating duct is oriented perpendicular to the straight linear alignment of the sealant feed channel.

The sealant feed tube forms a structural barrier to isolate sealant in the sealant feed channel from direct contact by air emanating from the hot air supply until the sealant leaves the sealant outlet opening. Separate upper, lower, and intermediate tunnels are preferably defined within the structure of the hot air conducting member leading from the hot air supply. The lower tunnel intersects the first plenum chamber. The second plenum chamber has upper, lower and intermediate portions. The upper tunnel leads to the upper portion of the second plenum chamber. The intermediate tunnel leads to the intermediate portion of the second plenum chamber within the heat and sealant delivery nozzle. There is a downstream channel formed adjacent and parallel to the linear sealant feed tube. The downstream channel forms the lower portion of the second plenum chamber.

In another broad aspect the invention may be considered to be a heat and sealant delivery nozzle for melting and delivering sealant into seams between exposed top surfaces of adjacent sheets of flooring. The nozzle is comprised of a sealant heating member and a hot air conducting member. The sealant heating member defines a hollow, straight sealant delivery tube oriented with a linear alignment and inclination relative to the exposed surfaces of the sheets of flooring. The sealant delivery tube has an upper sealant inlet opening and a lower sealant dispensing opening. The hot air conducting member has a hot air inlet connected to a hot air supply and a linear seam preheating contact edge located behind the sealant dispensing opening of the sealant delivery tube. A plurality of seam preheating ports are defined in the seam preheating contact edge of the hot air conducting member. The seam preheating ports are arranged in straight, linear alignment with each other and with the sealant dispensing opening.

The sealing heating member and the hot air conducting member are formed as separate structures that fit together and are secured together in mating fashion to define opposing sides of first and second internal plenum chambers. The first plenum chamber is located directly above the preheating contact edge. The seam preheating ports are located downstream from and in-hot airflow communication with the first plenum chamber. The first plenum chamber is located downstream from and in hot airflow communication with the hot air inlet.

The second plenum chamber is located adjacent the sealant delivery tube the wall of which forms a barrier between the second plenum chamber and sealant within the sealant delivery tube. A sealant preheating hot air delivery duct is defined in the hot air conducting member leading from the hot air inlet to a sealant preheating port located above the sealant inlet opening and physically isolated from both the first and second plenum chambers.

In still another aspect the present invention may be considered to be a heat nozzle for a handheld floor seam sealing device. The nozzle is comprised of a sealant heating member and a hot air conducting member initially formed as separate structures. Both of these members have flat, mating surfaces. The flat mating surface of at least one of the members is configured with plenum cavities having a plenum side wall recessed from the flat mating surface thereof. The sealant heating member and the hot air conducting member are secured together so that the flat, mating surfaces reside in face-to-face contact with each other. The hot air conducting member and the sealant heating member together delineate first and second hollow plenum chambers therebetween.

The hot air conducting member has a hot air inlet and with a plurality of internal inlet air ducts including a first inlet duct leading from the hot air inlet to the first plenum chamber. The hot air conducting member has a linearly elongated floor contact edge with forward and reward extremities located opposite the hot air inlet. A plurality of internal seam preheating passageways are formed leading from the first plenum chamber to air exhaust ports in the elongated floor contact edge.

The sealant heating member has a structure with a linear sealant heating channel defined therethrough. The sealant heating channel is isolated from both the first and second plenum chambers. The sealant heating channel terminates in opposing sealant inlet and sealant outlet openings. The sealant outlet opening in the sealant heating member lies adjacent and is linearly aligned with the straight line of the internal air exhaust ports in the hot air conducting member and is also linearly aligned with the forward extremity of the floor contact edge. A second air inlet duct is formed leading from the hot air inlet and to the second plenum chamber. The second plenum chamber is isolated from the sealant preheating duct by the structure of the sealant heating member.

A sealant preheating duct is defined within the hot air conducting member. The sealant preheating duct leads from the hot air inlet and terminates at a sealant preheating port adjacent and above the sealant inlet opening in the sealant feeding member.

The sealant heating member and the hot air conducting member are preferably permanently secured together. Alternatively, these members may be formed as detachable components. In this case one of the members is provided with a transverse internally threaded opening while the other member is provided with a transverse, mating opening slightly larger in diameter. A screw can be directed through the larger diameter opening and threadably engaged and tightened into the internally threaded opening in the other member. Preferably the nozzle consists only of the sealant feeding member and the hot air conducting member so that only two separate parts are required in the construction of the nozzle.

The invention may be described with greater clarity and particularity by reference to the accompanying drawings.

DESCRIPTION OF THE EMBODIMENT

Figure 1:
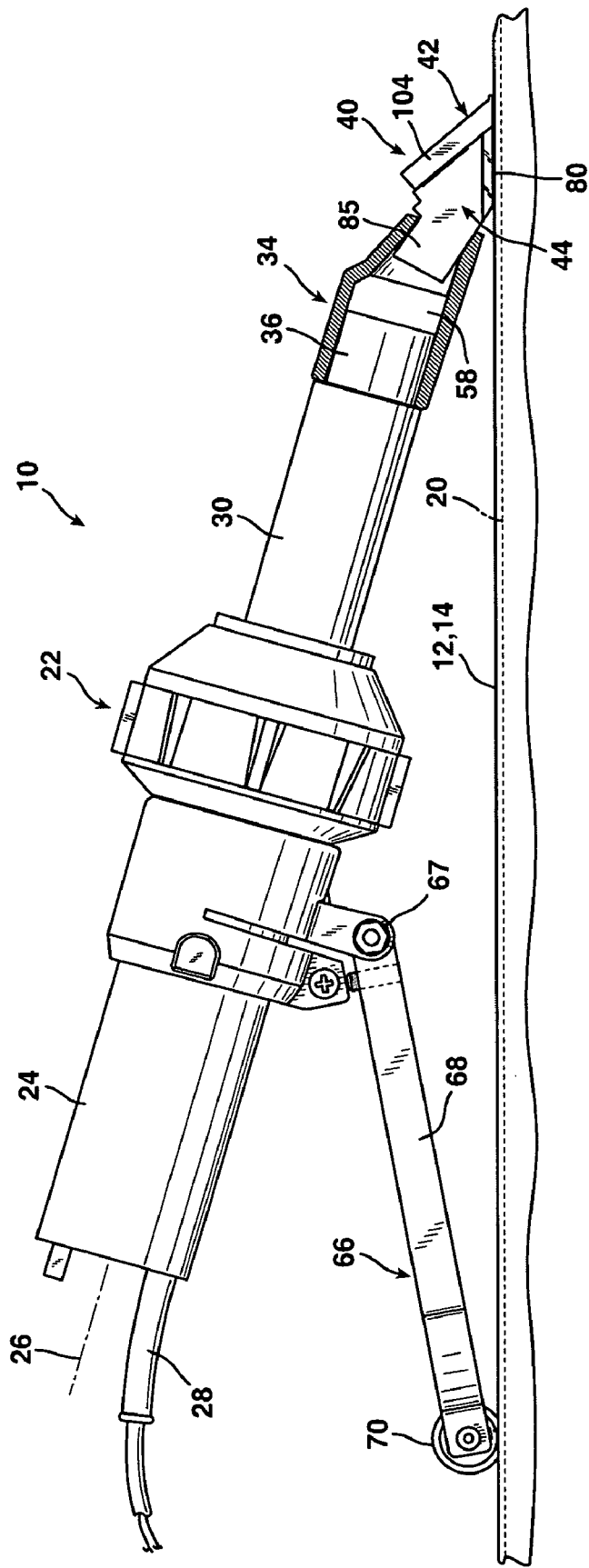
FIG. 1 is a side elevational view illustrating the use of a handheld seam welding tool employing a heat and sealant delivery nozzle according to the present invention.
Figure 2:
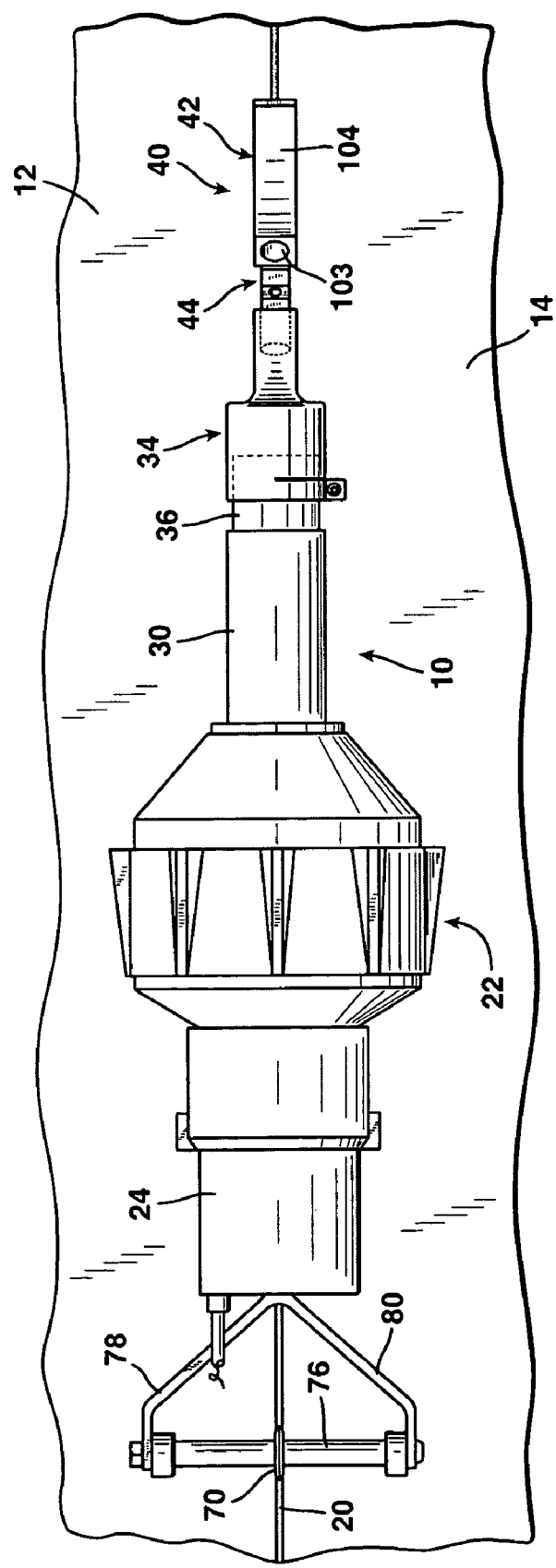
FIG. 2 is a top plan view of the handheld seam welding tool of FIG. 1.
Figure 12:
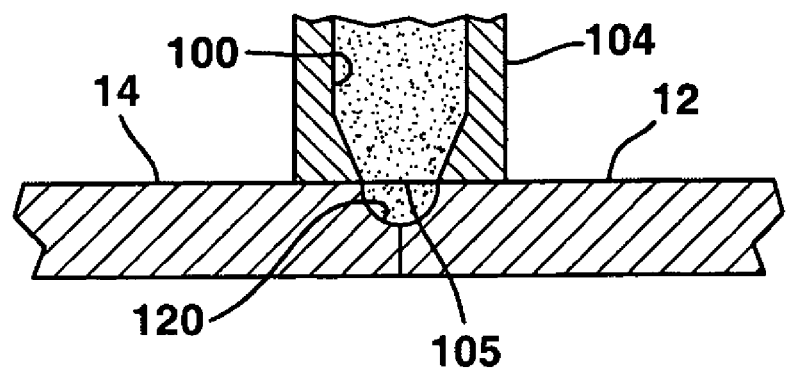
FIG. 12 is a transverse sectional detail taken along the lines 12-12 of FIG. 3.

FIG. 1 illustrates a handheld seam welding tool indicated generally at 10 for sealing floor seams between adjacent sheets of urethane linoleum flooring, depicted at 12 and 14 in FIG. 2. The urethane linoleum flooring sheets 12 and 14 are secured by a conventional layer of substrate linoleum adhesive to a subfloor of plywood or concrete. As illustrated in FIGS. 2 and 12, the adjacent flooring sheets 12 and 14 reside in abutting relationship. Prior to utilizing the seam welding tool 10, an upwardly facing, elongated groove 20 is formed in the upwardly facing, abutting edges of the flooring sheets 12 and 14 utilizing a conventional floor grooving tool. Very typically the groove 20 that is formed has a semicircular cross section as illustrated in FIG. 12.

The seam welding tool 10 illustrated in FIGS. 1 and 2 is a conventional Liester Triac model portable, handheld floor seam welding gun 22 having a body 24 of generally cylindrical configuration. This and another handheld floor seam welding gun are described in prior U.S. Pat. No. 5,656,126 which is hereby incorporated by reference in its entirety. The body 24 defines a longitudinal axis indicated at 26. The welding gun 22 is powered by commercially available alternating current through a power supply cord 28.

At its front end the seam welding gun 22 has a cylindrical, heat conducting member 30 that projects from the body 24. The heat conducting member 30 contains electrical resistance coils that heats air drawn into an air intake grate located at the back end of the body 24 by a vacuum motor located within the body 24. The air is heated in the heating member 30 as it is pumped by the motor forwardly into an adapter 34 that fits over the reduced diameter front end 36 of the heating member 30. The adapter 34 carries a nozzle 40 constructed according to the present invention.

When the nozzle 40 is mounted to the handheld floor seam welding gun 22, it is designed for use in association with a stabilizing roller guide 66. The roller guide 66 has an elongated, forwardly and upwardly projecting arm or stem member 68 and a disc-shaped seam follower 70 carried at the center of an axle 76 that is mounted between a pair of branching arms 78 and 80. The construction and operation of the roller guide 60 is substantially the same as that of the stabilizing guide illustrated and described in prior U.S. Pat. No. 5,656,126. The disc-shaped seam follower 70 follows the center of the groove 20 formed between the adjacent sheets of flooring 12 and 14 as the seam welding tool 10 is moved by the operator in a rearward direction, that is, from right to left as illustrated in FIGS. 1 and 2. The roller guide 66 ensures that the tool 10 remains precisely vertically aligned with the demarcation between the sheets of flooring 12 and 14 and also maintains the nozzle 40 at the correct orientation relative to the horizontal surface of the flooring sheets 12 and 14.

The heat and sealant delivery nozzle 40 is used to seal seams between the adjacent sheets of flooring 12 and 14. The nozzle 40 is formed of two initially separate, mating component elements, including a sealant heating member 42 and a hot air conducting member 44, both formed as molded and machined steel structures and illustrated in isolation and before attachment to each other in FIGS. 8 and 9, respectively.

The sealant feeding member 42 and the hot air conducting member 44 fit together and are preferably permanently secured to each other in mating fashion, by welding, to form the finished nozzle 40.

Figure 3:
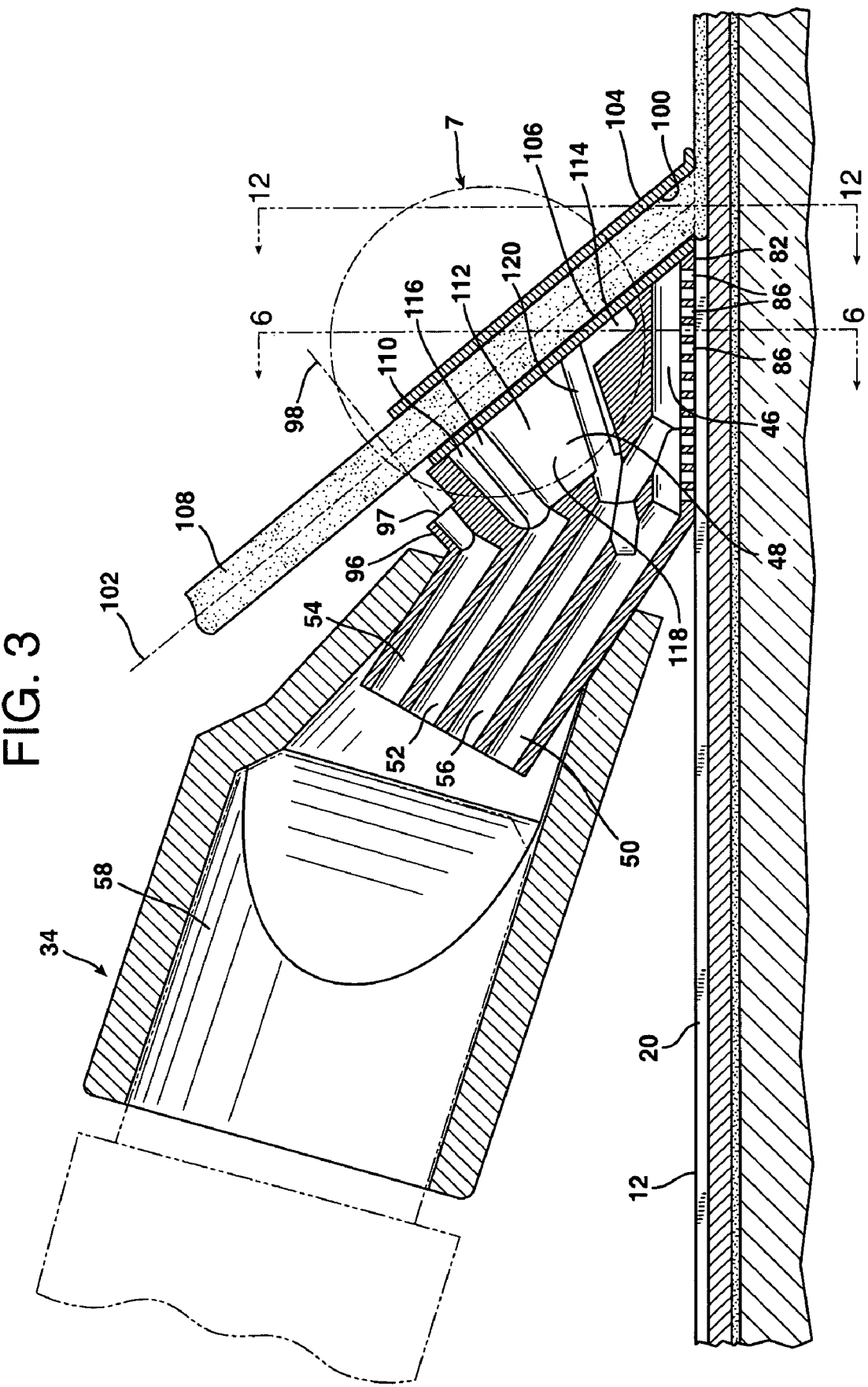
FIG. 3 is a side sectional detail showing the nozzle illustrated in FIG. 1.
Figure 9:
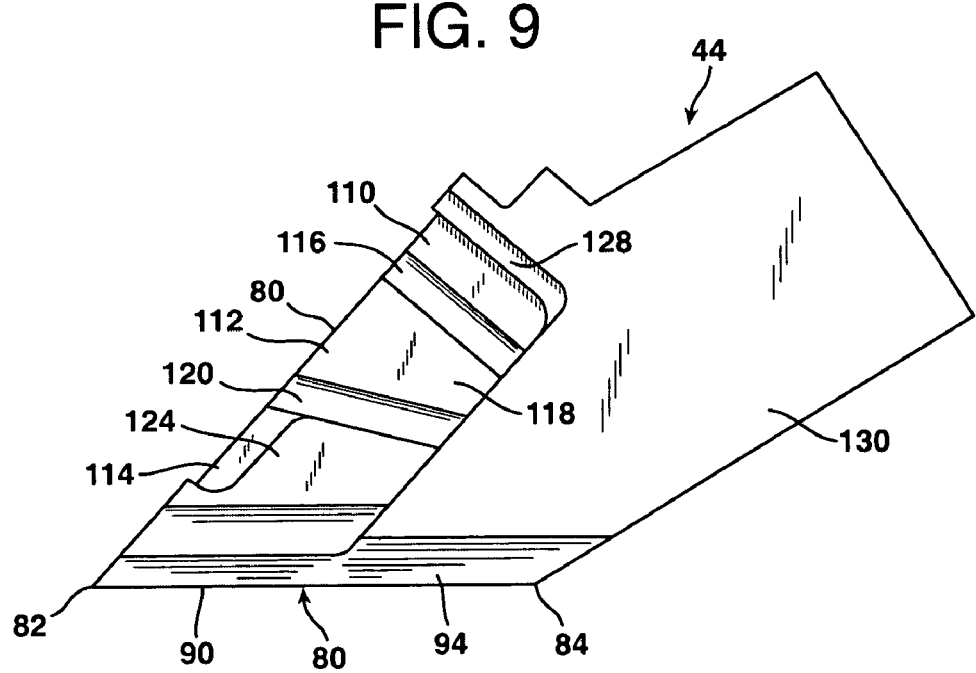
FIG. 9 is a side elevational view showing the hot air conducting member in isolation and illustrating its flat, mating surface.

Together the sealant feeding member 42 and the mating hot air conducting member 44 define both a first plenum chamber. 46 and a second plenum chamber 48, illustrated in FIG. 3 and 9. The sealant feeding member 42 and the hot air conducting member 44 also form a plurality of hot air inlet ducts, including a first duct 50, a second duct 52 and a sealant preheating duct 54, as well as an intermediate duct 56. All of the hot air inlet ducts 50, 52, 54, and 56 receive hot air from a hot air supply, which is the hollow enclosure 58 of the adapter 34, shown in FIG. 3. The hot air conducting member 44 has a hot air inlet 85 connected to the hot air supply 58. The first hot air inlet duct 50 leads from the hot air supply enclosure 58 to the first plenum chamber 46. The second hot air inlet duct 52 leads from the hot air supply enclosure 58 to the second plenum chamber 48.

Figure 6:
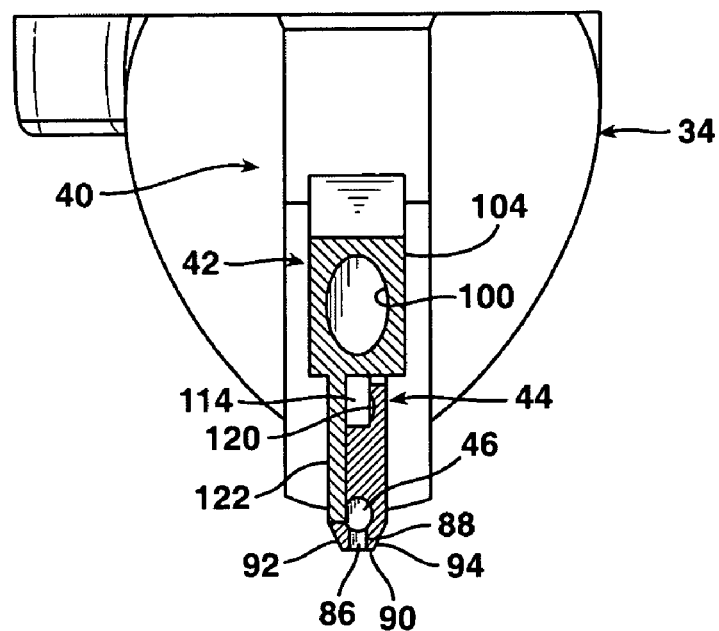
FIG. 6 is a transverse sectional detail of the nozzle in isolation taken along the lines 6-6 in FIG. 3.
Figure 10:
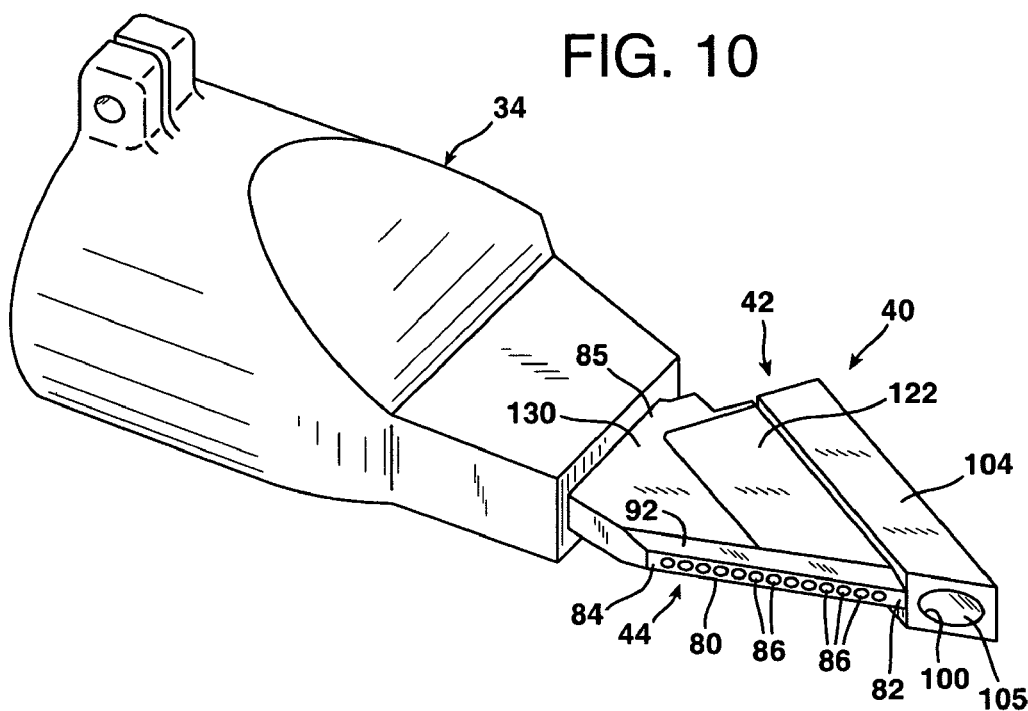
FIG. 10 is a bottom perspective view illustrating the nozzle of the invention mounted in an adapter.

The hot air conducting member 44 has a linear seam preheating contact edge 80 with a forward extremity 82 and a rearward extremity 84, shown in FIGS. 3, 6, and 10. The forward extremity 82 is located opposite the hot air inlet end 85 of the hot air conducting member 42. The seam preheating floor contact edge 80 is preferably about three centimeters in length. A plurality of separate hot air exhaust ports 86 are defined in the seam preheating floor contact edge 80 of the hot air conducting member 44. The hot air exhaust ports 86 lie in a straight line between the forward extremity 82 and the rearward extremity 84 along the length of the preheating contact edge 80.

Each of the hot air exhaust ports 86 is preferably no greater than about 0.5 mm in diameter. The exhaust ports 86 are preferably spaced from each other a distance of about 1 mm, center to center, along the length of the linear seam preheating contact edge 80. All of the hot air exhaust ports 86 are in airflow communication with the first plenum chamber 46, and are connected thereto by separate, short, mutually parallel passageways 88. Preferably, there are thirteen separate hot air exhaust ports 86 arranged in linear alignment with each other between the forward extremity 82 and a rearward extremity 84 of the seam preheating floor contact edge 80.

Figure 4:
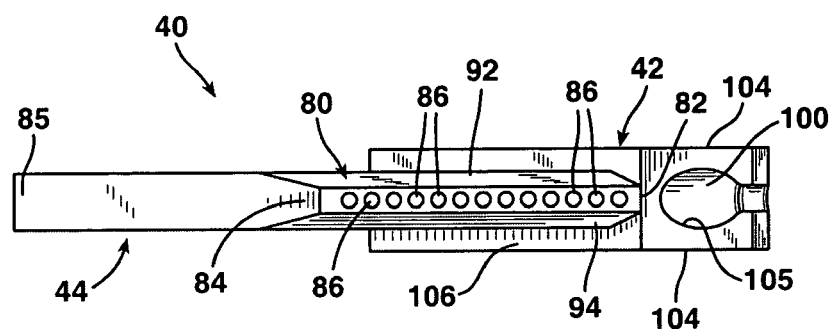
FIG. 4 is a bottom plan view of the nozzle shown in FIG. 3.

As illustrated in FIGS. 4 and 6, the linear seam preheating floor contact edge 80 has a narrow, flat edge center surface 90 in which the hot air exhaust ports 86 are formed. Inclined surfaces 92 and 94 slope upwardly and outwardly, in a transverse direction from the center surface 90. The flat edge center surface 90 is a narrow, rectangular strip approximately twenty-five millimeters in width and about three centimeters in length. In use, the center surface 90 is pressed flat against the horizontal upper surfaces of the flooring sheets 12 and 14, straddling the channel 20 therein. The inclined surfaces 92 and 94 are inclined upwardly relative to horizontal and relative to the center surface 90, preferably at an angle of about sixty-five degrees, as illustrated in FIG. 6. The seam preheating contact edge therefore has a truncated V-shaped or wedge-shaped cross-sectional surface configuration.

Figure 11:
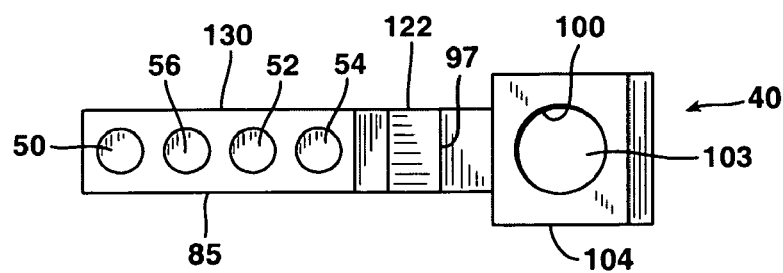
FIG. 11 is a transverse end detail taken along the lines 11-11 of FIG. 5.

The sealant feeding member 42 has a hollow, sealant feed tube 104 with an generally square outer cross-sectional configuration, as illustrated in FIG. 11. Within its structure the sealant feed tube 104 defines a sealant feed channel 100 which has a circular cross section, as illustrated in FIG. 11. The sealant feed channel 100 has a straight, linear axis of alignment, indicated at 102. When the sealant feeding member 42 is assembled with the hot air conducting member 44, as illustrated in FIG. 1, the linear axis of alignment 102 of the sealant feed channel 104 resides at an inclined, acute angle relative to the seam preheating contact edge 80. Preferably, the axis of alignment 102 of the sealant feed channel 100 is inclined relative to the flat edge center surface 90 of the seam preheating contact edge 80 approximately fifty degrees.

The straight sealant delivery tube 104 has an upper sealant inlet opening 103 and a lower sealant dispensing opening 105. The sealant feed channel 100 terminates in the opposing sealant inlet and sealant outlet openings 103 and 105, respectively. The lower sealant outlet or dispensing opening 105 in the sealant heating member 42 lies adjacent to and is linearly aligned with the straight line of the internal air exhaust ports 86 in the hot air conducting member 44 and also with the forward extremity 82 of the seam preheating floor contact edge 80. The sealant inlet opening 103 is located above the second plenum chamber 48. The sealant outlet opening 105 is formed adjacent to and forward from the contact edge 80 of the hot air conducting member 42.

The interior rearward wall 106 of the sealant feed tube 104 forms a structural barrier between the second plenum chamber 48 and sealant 108 within the sealant delivery tube 104. The wall 106 isolates sealant 108 in the sealant feed channel 100 from direct contact by air emanating from the hot air supply 58 until after the sealant 108 leaves the sealant outlet opening 105.

The sealant preheating duct 54 that is defined within the hot air conducting member 44 leads from the hot air inlet end 85 thereof and terminates at a sealant preheating port 97. The sealant preheating port 97 is adjacent and above the sealant inlet opening 103 in the sealant heating member 42 and is physically isolated from both the first and second plenum chambers 46 and 48.

As illustrated in FIGS. 3, the sealant preheating duct 54 has a downstream leg 96 that is oriented along a straight line indicated at 98. The downstream leg 96 of the sealant preheating duct 54 is perpendicular to and intersects the straight, linear axis of alignment 102 of the sealant feed channel 100.

The second plenum chamber 48 is formed immediately adjacent to the sealant feed tube 104. The interior wall 106 of the sealant feed tube 104 serves as a septum between the sealant feed channel 100 and the second plenum chamber 48 and isolates them from each other. That is, although hot air entering the second plenum chamber 48 heats the sealant 108 in the sealant feed tube 104 by thermal conduction through the wall 106, the hot air does not mix with the sealant 108 until after the sealant 108 has fully melted and has flowed under the force of gravity down into the groove 20.

The second plenum chamber 48 has an upper portion 110, an intermediate portion 112, and a lower portion 114. As illustrated in FIGS. 3 and 9, the upper tunnel 52 defined within the structure of the hot air conducting member 42 leads from the hot air supply 58 to the upper portion 110 of the second plenum chamber 48. The intermediate tunnel 56 defined within the structure of the hot air conducting member 42 leads from the hot air supply 58 to the intermediate portion 112 of the second plenum chamber 48. The lower portion 114 of the second plenum chamber 48 is formed by a downstream channel defined in the structure of the hot air conducting member 44.

Figure 8:
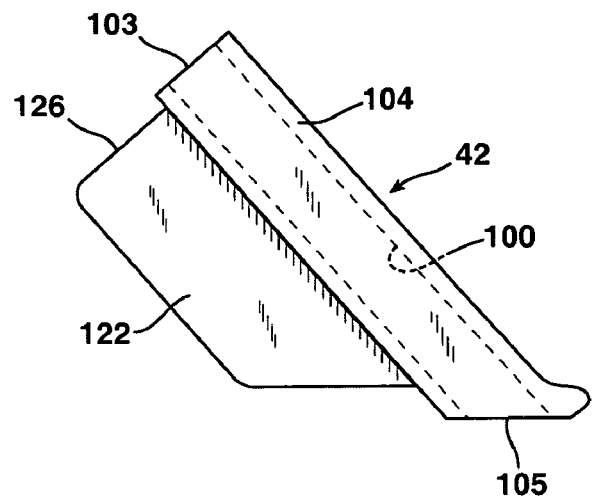
FIG. 8 is a side elevational view showing the sealant feeding member in isolation and illustrating its flat, mating surface.

As illustrated in FIGS. 8 and 9, the sealant heating member 42 and the hot air conducting member 44 are initially formed as separate nozzle component structures, both of which have flat, mating surfaces 122 and 124, respectively. The flat surface 124 of the hot air conducting member 44 is configured with plenum cavities having a plenum side wall 118 that is parallel to and recessed from the flat mating surface 124. Preferably, the plenum side wall 118 is recessed a distance of about two millimeters from the flat surface 124. The opposing flat mating surface 122 of the sealant heating member 42 is formed as a flat flange emanating from the interior rearward wall 106 of the sealant feed tube 104.

At its downstream end, the upper tunnel 52 has a sharp bend and empties into the second plenum chamber 48. An upper groove 116 is created in the side wall 118 of the second plenum chamber 48. Likewise, an intermediate groove 120 is created in the side wall 118 and leads from the intermediate tunnel 56 to the intersection between the intermediate portion 112 of the second plenum chamber 48 and the lower portion 114 of the second plenum chamber 48. As illustrated in FIG. 3, there is a cross connection of ducting between the first hot air inlet duct 50 and the intermediate hot air inlet duct 56. A portion of the heated air arriving from both of the ducts 50 and 56 passes through the first plenum chamber 46 to preheat the groove 20 in the flooring, while another portion of the heated air from those same ducts is directed into the intermediate portion 112 and lower portion 114 of the second plenum chamber 48.

Figure 7:
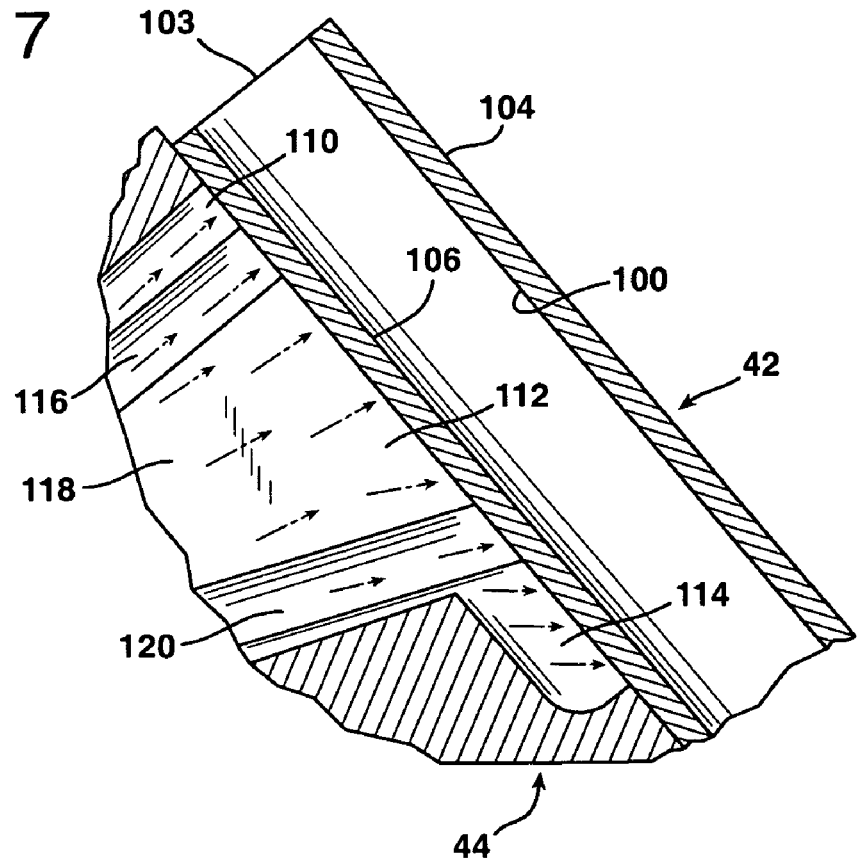
FIG. 7 is an enlarged side sectional detail of the portion of the nozzle indicated at 7 in FIG. 3, shown in isolation.

As illustrated in FIG. 7, the hot airflow from the tunnels 52 and 56 enters into the second plenum chamber 48 and circulates through the upper portion 110, intermediate portion 112, and lower portion 114 thereof to heat sealant 108 within the sealant feed tube 104 by thermal conduction through septum wall 106. The metal from which both the sealant feeding member 42 and hot air conducting member 44 are formed has a high coefficient of thermal conduction so that the sealant 108 is quickly heated within the sealant feed tube 104, but without the injection of air into the sealant feed channel 100. The interior wall 106 of the sealant feed tube 104 forms a barrier between the second plenum chamber 48 and the sealant 108 within the sealant delivery tube 104.

Prior to joining the sealant heating member 42 and the hot air conducting member 44 together, a line of linear, mutually parallel bores are drilled perpendicular into the flat edge center surface 90 to intersect the first plenum chamber 46. These bores create the line of passageways 88 leading from the first plenum chamber 46 to the elongated floor contact edge 80. Each seam preheating passageway 88 terminates at a single one of the plurality of separate air exhaust ports 86 that lie in a straight line along the length of the elongated floor contact edge 80. As illustrated in FIGS. 4 and 10, there are at least ten, and preferably thirteen seam preheating ports 86 formed in the preheating contact edge 80.

To assemble the nozzle 40, the sealant heating member 42 is flipped over from the orientation illustrated in FIG. 8 so that the flat mating surfaces 122 and 124 reside in direct contact with each other, and so that the edge 126 of the flat mating surface 122 seats upon a narrow ledge 128 that is recessed from the outer wall 130 of the hot air conducting member 44. The sealant heating member 42 and the hot air conducting member 44 are then secured together, preferably by welding along the generally trapezoidal interface at the demarcations of the peripheries of the flat mating surfaces 122 and 124.

Figure 5:
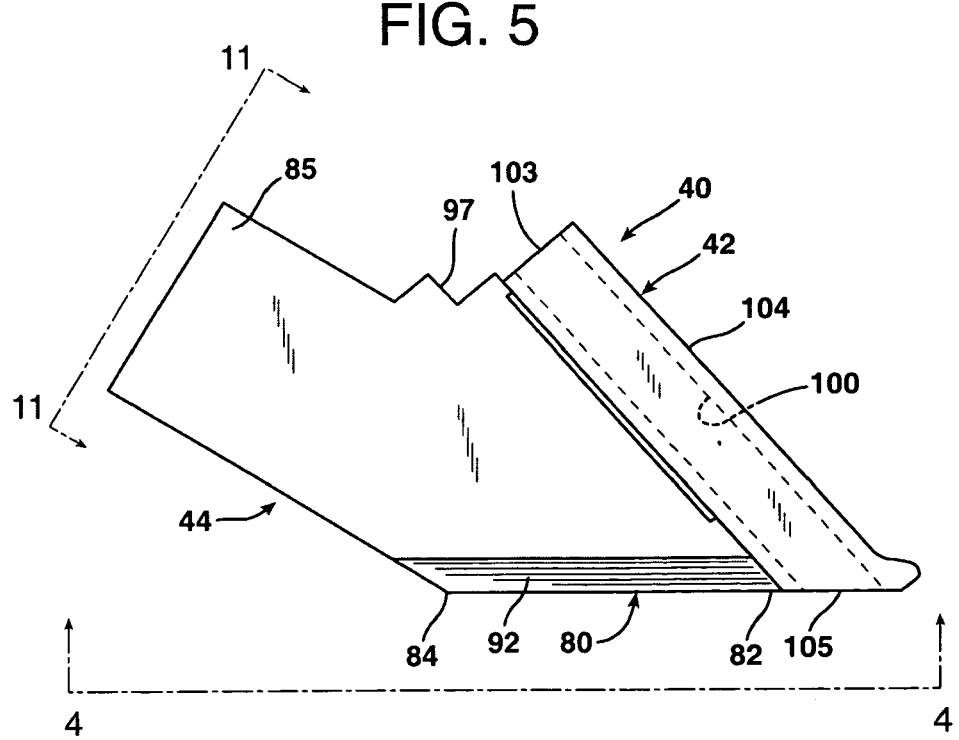
FIG. 5 is a side elevational detail of the nozzle shown in FIG. 3, illustrated in isolation.

Once the sealant heating member 42 and hot air conducting member 44 are assembled together, as illustrated in FIGS. 4, 5, and 10, the flat mating surfaces 122 and 124 reside in face to face contact with each other. The hot air conducting member 44 and the sealant heating member 42 together delineate the first hollow plenum chamber 46 and the second hollow plenum chamber 48 therebetween.

While the sealant heating member 42 and the hot air conducting member 44 can be releaseably coupled to each other, preferably they are permanently secured together. Furthermore, the heat nozzle 40 preferably consists of only the sealant feeding member 42 and the hot air conducting member 44. By fabricating the nozzle 40 from only two independently created parts, all of the bores, passageways and cavities that are ultimately enclosed can be formed in the component members 42 and 44 without great difficulty.

The operation of the handheld seam welding tool 10 and the function of the nozzle 40 are illustrated in FIGS. 1, 2, 3, and 12. As shown, when the tool is moved rearwardly along the flooring seam groove 20, the heat and sealant deliver nozzle 40 melts and delivers the sealant 108 into the groove 20 between exposed surfaces of adjacent sheets of flooring 12 and 14. The hollow, straight sealant delivery tube 104 is preferably oriented at an inclination of about fifty degrees relative to the exposed surfaces of the sheets of flooring 12 and 14.

The seam preheating floor contact edge 80 of the hot air conducting member 44 is located directly behind the sealant dispensing opening 105 of the sealant delivery tube 104. The seam preheating ports 86 reside in straight, linear alignment with each other and with the sealant dispensing opening 105.

The sealant feeding member 42 and hot air conducting member 44 define opposing sides of both the first internal plenum chamber 46 and the second internal plenum chamber 48. The first plenum chamber 46 is located directly above the preheating contact edge 80. The first plenum chamber 46 is located downstream from and in hot airflow communication with the hot air inlet 85. The seam preheating ports 86 are located downstream from and in hot airflow communication with the first plenum chamber 46.

With reference to FIGS. 1 and 2, the flooring installer adjusts the angle of the stem 68 of the roller guide 66 by loosening the adjustment securement nut 67, adjusting the angle of orientation of the stem 68 of the roller guide relative to the axis of alignment 26 of the heat welding gun 22, and then retightens the adjustment securement nut 67. The temperature of the heat welding gun 22 is dialed to the appropriate temperature of perhaps 250° C. to 275° C. A stick of sealant 108 is then fed into the sealant delivery tube 104, as illustrated in FIG. 3. The tool 10 is then moved in a rearward direction, that is from right to left, as illustrated in FIGS. 1 and 2. Hot air from the first plenum chamber 46 passes through the passageways 88 and out of the hot air exhaust ports 86 to preheat the portion of the groove 20 in the sheets of flooring 12 and 14 immediately to the rear of the molten sealant 108.

Concurrently, hot air from the sealant preheating hot air delivery duct 54 is directed through the downstream leg 96 thereof at the stick of sealant 108 entering the hollow, sealant feed tube 104. This preheating of the sealant 108 softens it as it enters the upper sealant inlet port 105. The sealant 108 is softened further as it descends down the sealant delivery tube 104 due to the hot air in the second plenum chamber 48 that heats the sealant 108 within the sealant feed channel 100 along the length of the second plenum chamber 48. When the sealant 108 approaches the sealant outlet opening 105 at the lower end of the sealant feed channel 100, the heat conducted to it from the sealant preheating port 97 and through the interior wall 106 of the sealant feed tube 104 is great enough to melt the sealant 108 as it emanates from the sealant outlet or discharge opening 105. The molten sealant 108 thereupon flows smoothly into the groove 20, as the seam welding tool 10 is moved rearwardly.

Due to the unique configuration of the nozzle 40, the edges of the sheets of flooring 12 and 14 along the groove 20 are neither discolored nor scorched. Also, the molten sealant 108 is neither discolored nor scorched, even when the sheets of flooring 12 and 14 are formed of urethane plastic. Consequently, the nozzle 40, with its unique pattern of ducts and passageways is able to produce a smooth seam between the adjacent sheets of urethane plastic flooring 12 and 14 that is superior to seams produced using conventional tools of the type previously described.

Figure 13:
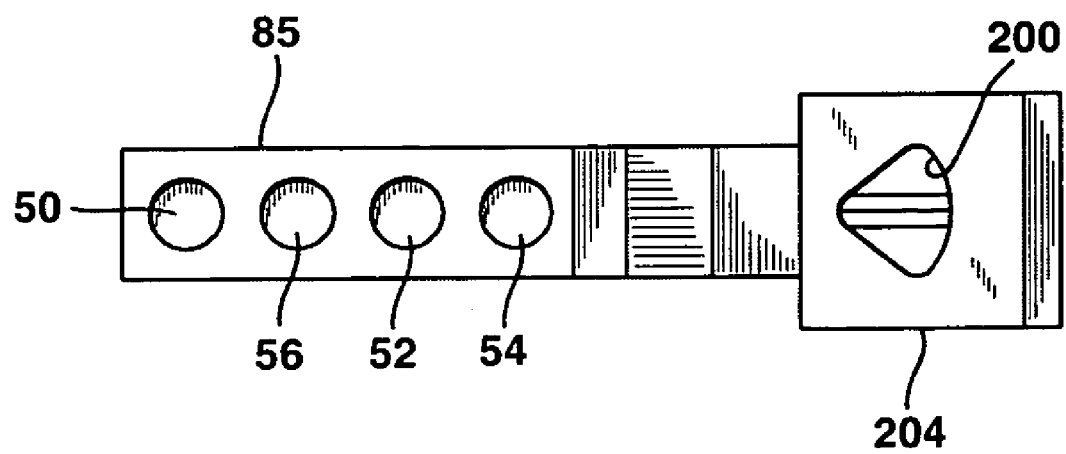
FIG. 13 is a transverse end view showing a nozzle with a sealant delivery tube of an alternative cross-sectional configuration to that illustrated in FIG. 11.

Undoubtedly, numerous variations and modifications of the invention will become readily apparent to those familiar with sealing seams between sheets of adjacent flooring. For example, the sealant feed channel 100 defined within the sealant feed tube 104 has a circular cross section, as illustrated in FIG. 11. This shape is suitable for receiving a stick of sealant 108 that has a circular cross section. Some sealant sticks are manufactured in other shapes, one of which is a semicircular shape. To accommodate a sealant stick with a semicircular cross section, the nozzle of the present invention preferably has a sealant feed tube 204 defining a sealant feed channel 200 of a more triangular shape, as illustrated in FIG. 13. Accordingly, the scope of the invention should not be construed as limited to this specific embodiment depicted and described, but rather as defined in the claims appended hereto.

I claim:

1. A heat and sealant delivery nozzle for sealing seams between adjacent sheets of flooring and formed from separate, mating sealant feeding and hot air conducting members that fit and are secured together to enclose first and second plenum chambers therebetween, whereby said sealant feeding member and said hot air conducting member together form a plurality of hot air inlet ducts for receiving hot air from a hot air supply including a first hot air inlet duct leading from said hot air supply to said first plenum chamber, a second hot air inlet duct leading from said hot air supply to said second plenum chamber, and said hot air conducting member has a linear seam preheating floor contact edge with forward and rearward extremities and a plurality of separate hot air exhaust ports lying along its length, all in airflow communication with said first plenum chamber, and said sealant feeding member has a hollow, sealant feed tube formed by its structure and defining a sealant feed channel therewithin that has a straight, linear alignment, and said sealant feed channel is isolated from direct airflow communication with said hot air supply, and said sealant feed channel has a sealant inlet opening above said second plenum chamber and a sealant outlet opening formed adjacent to and forward from said floor contact edge of said hot air conducting member, and said second plenum chamber is located immediately adjacent to said sealant feed tube which serves as a septum between said sealant feed channel and said second plenum chamber, and a sealant preheating duct is defined leading from said hot air supply to a sealant preheating port located above and immediately adjacent to said sealant feed tube.

2. A heat and sealant delivery nozzle according to claim 1 wherein said linear seam preheating floor contact edge has a narrow, flat edge center surface in which said hot air exhaust ports are formed, and inclined surfaces sloping upwardly and away from said narrow, flat edge center surface, whereby said floor contact edge has a truncated V-shaped surface configuration.

3. A heat and sealant delivery nozzle according to claim 2 wherein said sealant preheating duct has a downstream leg that is oriented in its alignment along a line of intersection with said straight linear alignment of said sealant feed channel, whereby a jet of hot air is ejected from said sealant preheating port and is directed at sealant entering said sealant feed channel.

4. A heat and sealant delivery nozzle according to claim 3 wherein said downstream leg of said sealant preheating duct is oriented perpendicular to said straight linear alignment of said sealant feed channel.

5. A heat and sealant delivery nozzle according to claim 1 wherein said sealant feed tube forms a structural barrier that isolates sealant in said sealant feed channel from direct contact by air emanating from said hot air supply until said sealant leaves said sealant outlet opening.

6. A heat and sealant delivery nozzle according to claim 1 further comprising separate upper, lower and intermediate tunnels defined within the structure of said hot air conducting member leading from said hot air supply, and said lower tunnel intersects said first plenum chamber, and said second plenum chamber has upper, lower and intermediate portions, and said upper tunnel leads to said upper portion of said second plenum chamber and said intermediate tunnel leads to at said intermediate portion of said second plenum chamber.

7. A heat and sealant delivery nozzle according to claim 6 further comprising a downstream channel lying adjacent and parallel to said linear sealant feed tube, and said downstream channel forms said lower portion of said second plenum chamber.

8. A heat and sealant delivery nozzle according to claim 1 wherein said linear seam preheating contact edge has a truncated, wedge shaped cross-sectional configuration.

9. A heat and sealant delivery nozzle for melting and delivering sealant into a seam between exposed surfaces of adjacent sheets of flooring comprising a sealant heating member defining a hollow, straight sealant delivery tube oriented with a linear alignment and inclination relative to said exposed surfaces of said sheets of flooring and having an upper sealant inlet opening and a lower sealant dispensing opening, a hot air conducting member having a hot air inlet connected to a hot air supply and a linear seam preheating contact edge located behind said sealant dispensing opening of said sealant delivery tube and a plurality of seam preheating ports are defined in said seam preheating contact edge of said hot air conducting member, and said seam preheating ports are arranged in straight, linear alignment with each other and with said sealant dispensing opening, and said sealant feeding member and said hot air conducting member are formed as separate structures that fit together and are secured together in mating fashion to define opposing sides of first and second internal plenum chambers, said first plenum chamber is located directly above said preheating contact edge and said seam preheating ports are located downstream from and in hot airflow communication with said first plenum chamber and said first plenum chamber is located downstream from and in hot airflow communication with said hot air inlet, and said second plenum chamber is located adjacent said sealant delivery tube which forms a barrier between said second plenum chamber and sealant within said sealant delivery tube, and a sealant preheating hot air delivery duct is defined in said hot air conducting member leading from said hot air inlet to a sealant preheating port located above said sealant inlet opening and physically isolated from both said first and second plenum chambers.

10. A heat and sealant delivery nozzle according to claim 9 wherein said linear seam preheating contact edge has a center strip parallel to said exposed surfaces of said adjacent sheets of flooring and is no greater than about 50 mm in width, and said preheating contact edge has a truncated, wedge-shaped cross-sectional configuration.

11. A heat and sealant delivery nozzle according to claim 10 wherein each of said seam preheating ports is a circular aperture no greater than about 0.5 mm in diameter and further comprising at least 10 of said seam preheating ports and said preheating contact edge is between about two centimeters and about four centimeters in length.

12. A heat and sealant delivery nozzle according to claim 11 further comprising about thirteen of said seam preheating ports and said preheating contact edge is about three centimeters in length.

13. A heat and sealant delivery nozzle according to claim 9 wherein said sealant preheating duct is formed as a passageway having a downstream end that is oriented in straight linear alignment at said sealant preheating port to intersect said linear alignment of said sealant delivery tube above said sealant inlet opening.

14. A heat and sealant delivery nozzle according to claim 13 wherein said downstream end of said sealant preheating duct is aligned perpendicular to said linear alignment of said sealant delivery tube.

15. A heat and sealant delivery nozzle according to claim 13 further comprising separate upper, lower and intermediate tunnels defined within the structure of said hot air conducting member and leading from said hot air supply, and said lower tunnel intersects said first plenum chamber, and said second plenum chamber has upper, lower and intermediate portions, and said upper tunnel is directed at said upper portion of said second plenum chamber and said intermediate tunnel is directed at said intermediate portion of said second plenum chamber.

16. A heat and sealant delivery nozzle according to claim 15 wherein said sealant preheating hot air delivery duct is formed as a passageway having a downstream end that is oriented in straight linear alignment at said sealant preheating port which alignment intersects said linear alignment of said sealant delivery tube above said sealant inlet opening, and all of said ducts and said tunnels are formed of cylindrical bores drilled into said hot air conducting member.

17. A heat nozzle for a handheld floor seam to sealing device comprising: a sealant heating member and a hot air conducting member initially formed as separate structures and both of which have flat, mating surfaces, and said flat mating surface of at least one of said members is configured with plenum cavities having a plenum side recessed from said flat, mating surface thereof, and said sealant heating member and said hot air conducting member are secured together so that said flat, mating surfaces reside in face-to-face contact with each other, whereby said hot air conducting member and said sealant heating member together delineate first and second hollow plenum chambers therebetween, and said hot air conducting member has a hot air inlet end with a plurality of internal inlet air ducts including a first inlet duct leading from said hot air inlet and to said first plenum chamber and said hot air conducting member has a linearly elongated floor contact edge with forward and rearward extremities located opposite said hot air inlet end, and a plurality of the internal seam preheating passageways are formed leading from said first plenum chamber to said elongated floor contact edge, whereby said seam preheating passageways terminate in a plurality of separate air exhaust ports lying in a straight line along the length of said elongated floor contact edge, and said sealant heating member has a structure with a linear sealant heating channel defined therethrough isolated from both said first and second plenum chambers and terminating in opposing sealant inlet and sealant outlet openings, and said sealant outlet opening in said sealant heating member lies adjacent to and is linearly aligned with said straight line of internal air exhaust ports in said hot air conducting member and with said forward extremity of said floor contact edge, a second air inlet duct is formed leading from said hot air inlet end to said second plenum chamber, and said second plenum chamber is isolated from said sealant heating channel by said structure of said sealant heating member, and a sealant preheating duct is defined within said hot air conducting member leading from said hot air inlet end and terminating at a sealant preheating port adjacent and above said sealant inlet opening in said sealant feeding member.

18. A heat nozzle according to claim 17 wherein said sealant heating member and said hot air conducting member are permanently secured together.

19. A heat nozzle according to claim 17 consisting only of said sealant feeding member and said hot air conducting member.

* * * * *